United States Patent [19]

Vasilevsky et al.

[11] Patent Number: 5,274,818
[45] Date of Patent: Dec. 28, 1993

[54] SYSTEM AND METHOD FOR COMPILING A FINE-GRAINED ARRAY BASED SOURCE PROGRAM ONTO A COURSE-GRAINED HARDWARE

[75] Inventors: Alexander D. Vasilevsky, Watertown; Gary W. Sabot; Clifford A. Lasser, both of Cambridge; Lisa A. Tennies, Bedford; Tobias M. Weinberg, Somerville; Linda J. Seamonson, Wellesley, all of Mass.

[73] Assignee: Thinking Machines Corporation, Cambridge, Mass.

[21] Appl. No.: 827,942

[22] Filed: Feb. 3, 1992

[51] Int. Cl.⁵ .............................................. G06F 9/00
[52] U.S. Cl. ..................................... 395/700; 395/650; 364/280.4; 364/228; 364/231.9
[58] Field of Search .................. 395/700, 650; 364/300

[56] References Cited

U.S. PATENT DOCUMENTS

| | | |
|---|---|---|
| 4,598,400 | 7/1986 | Hillis. |
| 4,667,290 | 5/1987 | Goss et al. ............................ 364/300 |
| 4,773,038 | 9/1988 | Hillis et al. . |
| 4,827,403 | 5/1989 | Steele, Jr. et al. . |
| 4,984,235 | 1/1991 | Hillis et al. . |
| 5,175,856 | 12/1992 | Van Dyke et al. .................. 395/700 |

OTHER PUBLICATIONS

David Douglas et al., "The Architecture of the CM-2 Data Processor", Technical Report HA88-1, Thinking Machines Corp., Cambridge, MA. Apr. 1988.
Gary Sabot et al., "CM Fortran Optimization Notes: Slicewise Model", Technical Report TMC-184, Thinking Machines Corp., Cambridge, MA., Mar. 1991.
Gary Sabot, "Optimized CM Fortran Compiler for the Connection Machine Computer", *Proceedings of the IEEE Intl. Conf. on System Sciences*, pp. 161-172, Jan. 1992.

*Primary Examiner*—Kevin A. Kriess
*Assistant Examiner*—Kevin Spivak
*Attorney, Agent, or Firm*—Sterne, Kessler, Goldstein & Fox

[57] ABSTRACT

The present invention provides a parallel vector machine model for building a compiler that exploits three different levels of parallelism found in a variety of parallel processing machines, and in particular, the Connection Machine ® Computer CM-2 system. The fundamental idea behind the parallel vector machine model is to have a target machine that has a collection of thousands of vector processors each with its own interface to memory. Thus allowing a fine-grained array-based source program to be mapped onto a course-grained hardware made up of the vector processors. In the parallel vector machine model used by CM Fortran 1.0, the FPUs, their registers, and the memory hiearchy are directly exposed to the compiler. Thus, the CM-2 target machine is not 64K simple bit-serial processors. Rather, the target is a machine containing 2K PEs (processing elements), where each PE is both superpipelined and superscalar. The compiler uses data distribution to spread the problem out among the 2K processors. A new compiler phase is used to separate the code that runs on the two types of processors in the CM-2; the parallel PEs, which execute a new RISC-like instruction set called PEAC, and the scalar front end processor, which executes SPARC or VAX assembler code. The pipelines in PEs are filled by using vector processing techniques along the PEAC instruction set. A scheduler overlaps the execution of a number of RISC operations.

19 Claims, 10 Drawing Sheets

```
do i=1,64           do i=65,128          do i=131009,131072
  R0=b(i)             R0=b(i)              R0=b(i)
  R1=R0+c(i)          R1=R0+c(i)           R1=R0+c(i)
  a(i)=R1             a(i)=R1       ...    a(i)=R1
  R1=R0*d(i)          R1=R0*d(i)           R1=R0*d(i)
  b(i)=R1             b(i)=R1              b(i)=R1
enddo               enddo                enddo
    PE-1                PE-2                  PE-2048
```

FIG. 7

```
do i=1,64           do i=65,128          do i=131009,131072
  a(i)=b(i)+c(i)      a(i)=b(i)+c(i)       a(i)=b(i)+c(i)
enddo               enddo                enddo
do i=1,64           do i=65,128    ...   do i=131009,131072
  b(i)=b(i)*d(i)      b(i)=b(i)*d(i)       b(i)=b(i)*d(i)
enddo               enddo                enddo
    P1-32               P33-64               P65505-65536
```

FIG. 8

```
do i=1,64            do i=65,128              do i=131009,131072
  R0=b(i)              R0=b(i)                  R0=b(i)
  R1=R0+c(i)           R1=R0+c(i)               R1=R0+c(i)
  R2=R1+d(i)           R2=R1+d(i)       •••     R2=R1+d(i)
  a(i)=R2              a(i)=R2                  a(i)=R2
enddo                enddo                    enddo

```
do i=1,64            do i=65,128              do i=131009,131072
  t(i)=b(i)+c(i)       t(i)=b(i)+c(i)           t(i)=b(i)+c(i)
enddo                enddo                    enddo
do i=1,64            do i=65,128      •••    do i=131009,131072
  a(i)=t(i)+d(i)       a(i)=t(i)+d(i)           a(i)=t(i)+d(i)
enddo                enddo                    enddo

SYSTEM AND METHOD FOR COMPILING A FINE-GRAINED ARRAY BASED SOURCE PROGRAM ONTO A COURSE-GRAINED HARDWARE

CROSS-REFERENCE TO OTHER APPLICATIONS

The following applications are assigned to the assignee of the present application:

U.S. patent application Ser. No. 07/042,761, filed Apr. 27, 1987, by W. Daniel Hillis, entitled "Method and Apparatus for Simulating M-Dimensional Connection Networks in an N-Dimensional Network Where M is Less Than N", is incorporated herein by reference in its entirety.

U.S. patent application entitled "System and Method for Compiling Towards a Super-Pipelined Architecture", Ser. No. 07/830,564, filed Feb. 3, 1992 is incorporated herein by reference in entirety.

U.S. patent application entitled "System and Method for Mapping Array Elements to Processing Elements", Ser. No. 07/829,482, filed Feb. 3, 1992, is incorporated herein by reference in its entirety.

U.S. patent application entitled "System and Method for Compiling Vector Instructions", Ser. No. 07/827,945, filed Feb. 3, 1992 is incorporated herein by reference in its entirety.

INCORPORATION BY REFERENCE

U.S. Pat. No. 4,598,400 issued Jul. 1, 1986, to W. Daniel Hillis, for "Method and Apparatus for Routing Message Packets", and assigned to the assignee of the present application, is incorporated herein by reference in its entirety.

U.S. Pat. No. 4,773,038, issued Sep. 20, 1988, to Hillis et al., for "Method of Simulating Additional Processors in A SIMD Parallel Processor Array", and assigned to the assignee of the present invention, is incorporated by reference in its entirety.

U.S. Pat. No. 4,827,403, issued May 2, 1989, to Steele, Jr. et al., for "Virtual Processor Techniques in a SIMD Multiprocessor Array", and assigned to the assignee of the present invention, is incorporated herein by reference in its entirety.

U.S. Pat. No. 4,984,235, issued Jan. 8, 1991, to Hillis et al., for "Method and Apparatus for Routing Message Packets and Recording the Routing Sequence", and assigned to the assignee of the present application, is incorporated herein by reference in its entirety.

BACKGROUND OF THE INVENTION

1. Field of the Invention

The invention relates generally to a system and method of compiling a computer program, and more particularly, to a system and method for compiling a computer program wherein the computer program is adapted for use with a data parallel computer.

2. Discussion of Related Art

A compiler is a computer program which receives a source program as input. The source program is written in a source language. The compiler translates the source program into an equivalent target program. As a general reference that describes the principles used to design compilers for serial computers see Aho et al., *Compilers, Principles, Techniques and Tools.*, Addison-Wesley Publishing Co., (1988) which is hereby incorporated by reference in its entirety herein. The target program is written in target language. Many source and target languages are known. For example, source languages include: APL, Ada, Pascal, Fortran, C, and Lisp. Target languages include machine languages for computers having one or a great number of processors. Compilers which support parallel data processing allow the definitions and use of parallel variables. For reference purposes, such compilers are called data parallel compilers.

For Example, the Connection Machine ® (CM) computer CM-2 system, designed by Thinking Machines Corp., Cambridge, Mass. 0.2142, is a massively parallel computer with up to 65,536 bit serial processors and 2048 floating point accelerator chips. The CM-2 evolved out of the CM-1, which did not have any floating point hardware. The primary interface used by CM-2 compilers has been the Paris assembly language. The Paris language is a low-level instruction set for programming the data parallel computer. The Paris language is described in the Thinking Machines Corporation documents *Paris Reference Manual* (Version 6.0, February 1991) and *Revised Paris Release Notes* (Version 6.0, February 1991). These documents are available from the Thinking Machines Corporation Customer Support Department at 245 First Street, Cambridge, Mass. Even though Paris is implemented in a way that uses the underlying floating point hardware to perform calculations, it still reflects the fat that the CM-1 had no registers: All Paris operations (also called fieldwise operations) are memory to memory. This places a memory bandwidth limit on the peak gigaflop rating of Paris, and therefore on compilers whose target is the Paris language. This limit is approximately 1.5-2.5 gigaflops in a full size CM-2 (64K bit serial processors, 2K FPUs). The higher speeds can be attained by multiply-add instructions, which are only useful in special situations.

The CM-2 provides three dimensions of parallelism: superpiperlines, superscalar, and multiple processors. A more in depth discussion of the these concepts can be found in Almasi et al., *Highly Parallel Compiling*, Benjamin/Cummings Publishing Co. (1989), Hennessy et al., *Computer Architecture A Quantitative Approach*, Morgan Kaufmann Publishers (1990) and Johnson, *Superscaler Microprocessor Design*, Prentice-Hall (1991) which are hereby incorporated by reference in their entirety herein.

Generally, pipelining is an implementation technique whereby multiple instructions are overlapped in execution. Today, pipelining is one of the key implementation techniques used to build fast processors. A pipeline is like an assembly line: Each step is the pipeline completes a part of the instruction. Each of the steps is called a pipe stage or pipe segment. The stages are connected one to the next to form a pipe—instructions enter at one end, are processed through the stages, and exit at the other end. Pipelining is an implementation technique that exploits parallelism among the instructions in a sequential instruction stream. It has a substantial advantage over scalar sequential processing.

The throughput of the pipeline is determined by hot often an instruction exits the pipeline. Because the pipe stages are hooked together, all the stages must be ready to proceed at the same time. The time required between moving an instruction one step down the pipeline is a machine cycle. Pipelining yields a reduction in the average execution time per instruction.

The term superscalar describes a computer implementation that improves performance by concurrent execution of scalar instructions—Superscalar processors typically allow the widening the processors' pipeline. Widening the pipeline makes it possible to execute more than one instructions per cycle. Thus, superscalar refers to issuing more than one instruction per clock cyce. This allows the instruction-execution rate to exceed the clock rate.

In regard to the issue of multiple processor, designers of parallel computers tried a variety of methods in order to fully utilize the underlying hardware. For example, earlier parallel computer systems assumed a separate processor for every data element, so that one may effectively operate on all data elements in parallel. When one such instruction is is used, it is performed (possibly conditionally) by every hardware processor, each on its own data. Many of the usual arithmetic and logic instructions found in contemporary computer instruction sets (such as, substrate, multiply, divide, max, min, compare, logical and, logical or, logical exclusive or, and floating point instructions) are provided in this form.

A typical difficult with these computer systems is when the number of data elements in the problem to be solved exceeds the number of hardware processors. For example, if a machine provides 16,384 processors configured in a 128×128 two dimensional grid, and a problem requires the processing of 200×200 elements (total 40,000), the programming task is much more difficult because one can no longer assign one data element to each processor, but must assign two data elements to some processors. Even if a problem requires no more than 16,384 data elements, if they are to be organized as a 64×256 grid rather than a 128×128 pattern, programming is again complicated, this time because the problem communication structure does not match the hardware communication structure.

One solution to this problem was described in U.S. Pat. No. 4,827,403 to Steel, Jr. et al. The '403 patent describes a virtual processor mechanism which causes every physical hardware processor to be used to simulate multiple virtual processors. Each physical processor simulates the same number of virtual processors. However, the virtual processor model creates an artificial memory hiearchy. For example, FIG. 1 has sixteen virtual processor on one of the bit serial processors. The memory (m) would get sub-divided into sixteen blocks (m/16). The elements of an array [A(0)−A(N)], where the array element A(0−A(16) are placed in the sixteen virtual processors. This creates a problem. The gap between the elements, as shown at reference number 550, is very large. This creates a very series memory performance degradation. Instead of having one cycle per access you get two cycles per access or more. This division of memory is not what the user wanted. The user wanted to put sixteen elements next to each other and operate on them.

The goal of the compiler designer is to try and exploit all three levels of parallelism (i.e., superpipelines, superscalar, and multiple processors. This has presented a substantial problem. As stated by Hennessy et al. (pg. 581), compilers of the future have two obstacles to overcome: (1) how to lay out the data to reduce memory hierarchy and communication overhead, and (2) exploitation of parallelism. Parallelizing compilers have been under development since 1975 but progress has been slow.

Thus, it would be advantageous to provide a system and method for exploiting the inherent parallelism of parallel target machines and reducing the memory hierarchy, thus allowing the machine to go beyond the memory bottleneck.

SUMMARY OF THE INVENTION

In view of the foregoing, the present invention provides a parallel vector machine model for building a compiler that exploits three different levels of parallelism found in a variety of parallel processing machines (e.g., the Connection Machine ® Computer CM-2 system). The fundamental idea behind the parallel vector machine model is to have a target machine that has a collection of thousands of vector processors each with its own interface to memory. Thus allowing a fine-grained array-based source program to be mapped onto a course-grained hardware.

In the parallel vector machine model used by CM Fortran 1.0, the FPUs, their registers, and the memory hierarchy are directly exposed to the compiler. Thus, the CM-2 target machine is not 64K simple bit-serial processors. Rather, the target is a machine containing 2K PEs (processing elements), where each PE is both superpipelined and superscalar. The compiler uses a data distribution to spread the problem out among the 2K processors. A new compiler phase is used to separate the code that runs on the two types of processors in the CM-2; the parallel PEs, which execute a new RISC-like instruction set called PEAC, and the front end processor, which executes SPARC or VAX assembler code. The pipelines in PEs are filled by using vector processing techniques along with the PEAC instruction set. A scheduler overlaps the execution of a number of RISC operations.

In particular, the methodology involved in utilizing the parallel vector machine model in the CM-2 comprised handcrafting the best possible microcode for the benchmark kernels, defining a RISC-like assembly language that could be assembled into microcode with similar performance properties, and then designing a compiler to generate that new assembly language. The new assembly language produced a new model of the CM-2, one in which the key element was the FPU and than the bit-serial processor.

To implement the parallel vector machine model the 64-bit floating-point accelerators of the CM-2 are used as the basic physical processing elements. By treating the CM-2 as a set of vector processors, instead of a set of bit-serial processors, and thus using the floating-point registers to avoid many read/writes to memory, the parallel vector machine model excels at performing elemental operations on floating-point and integer data. The driving factor behind the development of the slicewise model is the performance potential of using the registers and vector-processing capabilities of the units (chips) of the 64-bit floating point accelerator.

Special microcode can make explicit use of the FPU registers as the source of operands and the destination of results for elemental computations, thus avoiding memory loads and stores. Also, the 64-bit FPU can be used as a vector processor—actually, a set of vector processors, each with a vector length of 4. The theoretical peak performance of such code (that is with loads and stores and without communication) is 14 Gflops for a full-sized CM-2. The goal of the slicewise execution model is to allow CM Frotran programs to exploit this performance enhancement.

The compiler itself does not perform CM-2 memory management or interprocessor (meaning inter-PE) communication. Instead, it call the functions of a run-time library. The fun-time system lays out arrays in CM-2 memory differently depending on the number of PEs available to execute the program. Since array layout is not determined at compile time, you can run a CM Fortran program on any size CM system without recording or recompiling As with the Paris model, the (physical) PE loops over the array elements assigned to it, repeating each instruction as many times as necessary.

BRIEF DESCRIPTION OF THE DRAWINGS

The foregoing and other features and advantages of the invention will be apparent from the following more particular description of the preferred embodiments of the invention, as illustrated in the accompanying drawings, in which:

FIG. 7 shows an example of mapping a simple elemental program onto the CM-2 by the slicewise compiler;

FIG. 8 shows an example of mapping a simple elemental program onto the CM-2 by Paris (fieldwise);

FIG. 9 shows an example of mapping a simple elemental program with a three-operand RHS onto the CM-2 by the slicewise compiler FIG. 10 shows an example of mapping a simple elemental program with a three-operand RHS onto the CM-2 by Paris (fieldwise).

DETAILED DESCRIPTION OF THE PRESENT INVENTION

Figure 1:
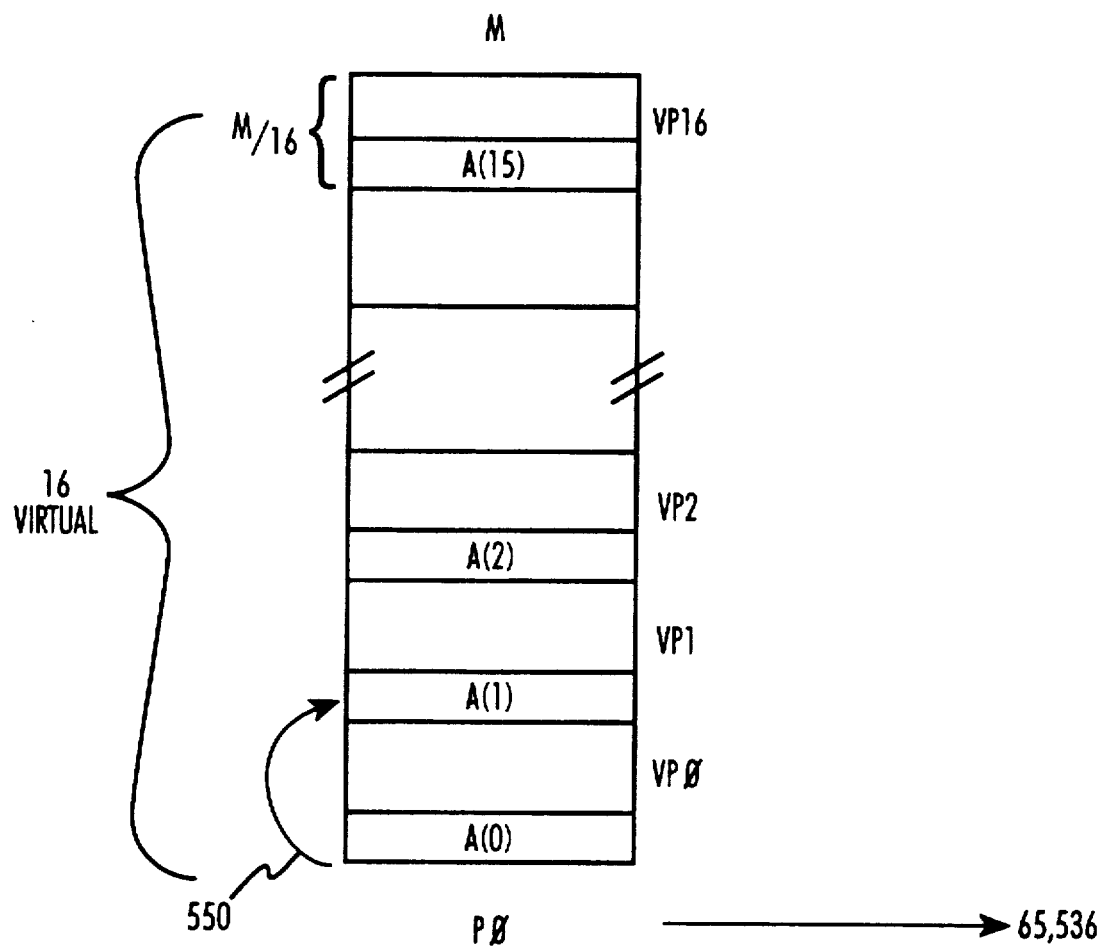
FIG. 1 shows an example of the artificial memory hierarchy present with a virtual processor model.

The present invention is directed to a software compiler for compiling a computer program wherein the computer program is adapted for use with a data parallel computer.

The data parallel computer may be one manufacturing by Thinking Machines Corporation, such as the Connection Manchine ® Model CM1 ®, CM2 ® and CM5 ® Supercomputers. These are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including one embodiment of processors and router, with which the present invention can be used. U.S. Pat. No. 4,984,235 describes a massively-parallel computer. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating 2-, 3-, or higher dimensional nearest-neighbor communication network ("NEWS") between chips using the hypercube wires.

The present invention provides a parallel vector machine model (also referred to as the slicewise model) for exploiting the three levels of parallelism found in some data parallel machines. The fundamental idea behind the parallel vector machine model of the present invention is to have machine that has a collection of thousands of vector processors each with its own interface to memory. This allows the machine to go beyond the memory bottleneck associated with the previous Paris model.

The methodology of solving the problem of exploiting the inherent parallelism in the CM-2 machine involved handcrafting the best possible microcode for the benchmark kernels, defining a RISC-like assembly language that could be assembled into microcode with similar performance properties, and then designing a compiler to generate that new assembly language. The new assembly language gave us a new model of the CM-2, one in which the key element was the FPU rather than the bit serial processor. The overall result of the compiler changes has been a 2-3 times increase in computation performance on the benchmark codes.

I. Overview of CM Fortran Array Features

CM Fortran basically consists of Fortran 77 with the array features of the ISO Fortran 90 standard added in. Although Fortran 90 contains a number of other interesting and useful features, it is the array features which allow parallelism to be exploited. The description of Fortran 90 array features below is an abbreviation of the one in Albert et al., Compiling Fortran 8×Array Features for the Connection Machine *Computer System, Symposium on Parallel Programming: Experience with Applications, Languages and Systems,* ACM SIGPLAN (July 1988) which is hereby incorporated by reference in its entirety. Some of the more important Fortran 90 array features include:

array assignments involving entire arrays or array sections:
  if A and B are conformable (same shape) arrays of any rank, the statement A=B assigns each element of B to the corresponding element of A.
  A(2:N+1)=B(1:N) assigns the first N elements of the one-dimensional array B to A in positions from 2 to N+1.
  A(2:N+1)=B(1:N:−1) assigns the same elements in reverse order.
arithmetic operations on arrays and array sections:
  B+C indicates an element wise addition of the arrays B and C.
  A(2*N:2:−2) * B(3:N+2) calls for multiplication of the described subsections of A and B. In this case, it would produce a one-dimensional array of length N+1 containing in sequence the values A(2*N)*B(3), A(2*N=2)*B(4), ..., A(2)*B(N+2).
  relational operations such as A .EQ. B are allowed, and return arrays of booleans.
masked array assignments. For example , WHERE (B .NE. 0) B=A/B assigns the quotient of A and B to the non-zero elements of B.
array intrinsic functions:

elemental array functions, such as SIN, which extend scalar operations to elementwise operations on arrays.

transformational functions such as CSHIFT (circular shift) and EOSHIFT (end-off shift).

array reduction functions such as ALL, ANY, COUNT, MAXVAL, MINVAL, PRODUCT, and SUM. Each of these functions has two forms: one reducers an entire array to single dimension and returns an array of rank one less than its argument.

array construction functions such as RESHAPE and SPREAD.

vector-valued subscripts:

A vector integer expression is used to specify an array section. For example, if V is a one-dimensional array with elements 3, 4, 22, and 6 then A(V) evaluates to [A(3), A(4), A(22), A(6)]

When used on the right-hand side of an assignment statement, a vector-valued subscript performs a gather type of operation. On the left-hand side, it acts like a scatter.

There are many other Fortran 90 array features (and they are supported by CM Fortran), but these are few and sufficient to give the flavor of the language.

II. The Slicewise CM-2 Target Machine

This section will attempt to give an intuitive understanding of what the target machine looks like to the compiler and how the generated code will work. The key features of the target machine are that it contains a large number of vectors processors which can communicate through a variety of communication networks. The central issues in the slicewise model are array layout (mapping of arrays to CM processors), FPU register utilization, and memory utilization.

A. Hardware Configuration

Figure 2:
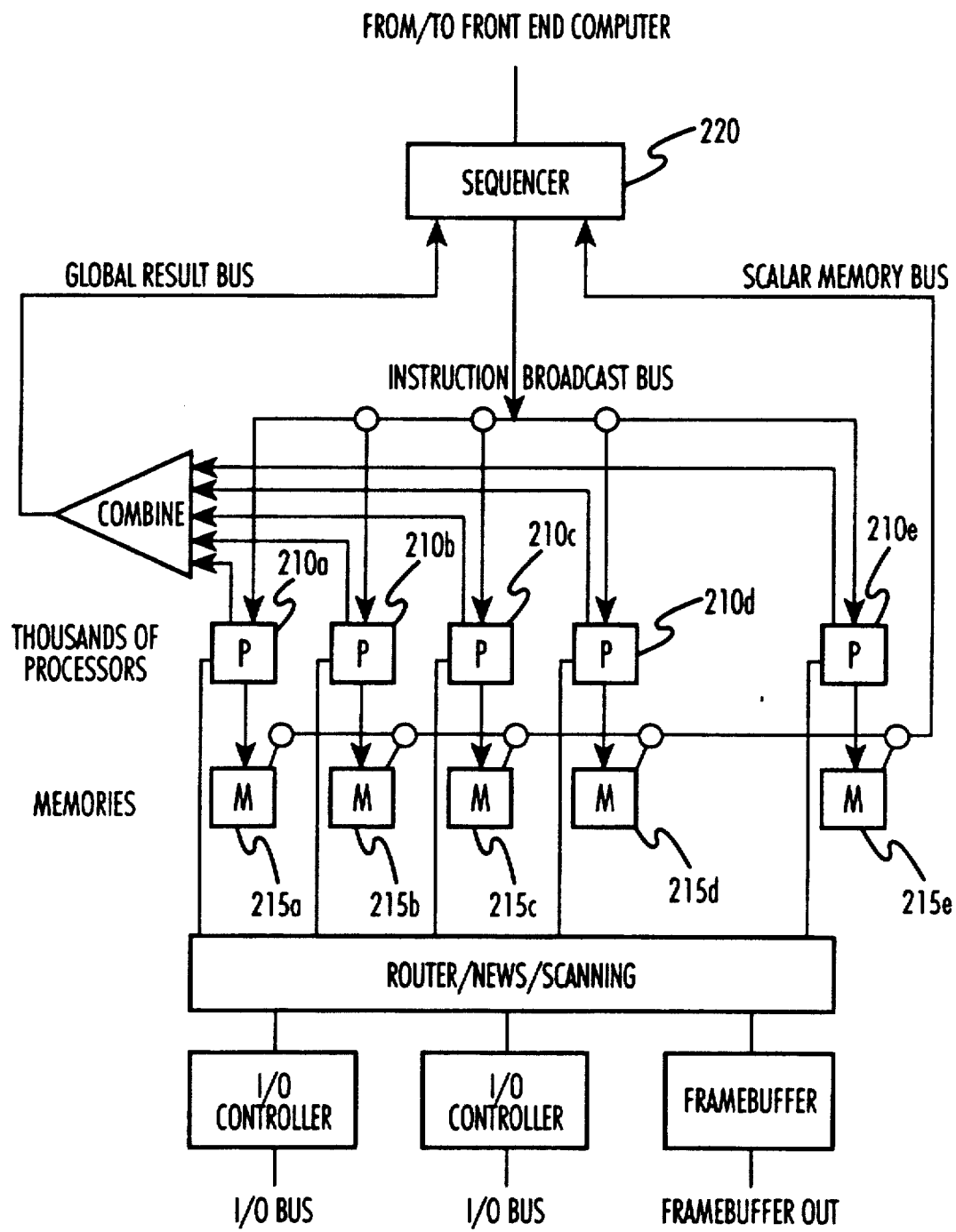
FIG. 2 shows a system configuration for the massively parallel CM-2.

The hardware elements of a Connection Machine CM-2 system include front-end computers such as the Sun-4 ® and VAX ® that provide the development and execution environments for the users' software, a parallel processing unit which executes the data parallel operations, and a high-performance data parallel I/O system. The parallel processing unit of a fully populated CM-2 consists of 64K bit-serial processors, 2048 Weitek WTL6164 64-bit floating points units, and an interprocessor communications system (Douglas et al., *The architecture of the CM-2 data processor*, Technical Report HA88-1, Thinking Machines Corporation, Cambridge, Mass. 02142 (1988)). Although it is called a "floating point" accelerator, the WTL6164 FPU is not limited to performing floating point calculations. It is a complete ALU, and can perform both integer and logical operations. This ability is crucial to the slicewise compiler (i.e., the compiler for the slicewise model), therefore the FPU's will be referred to as Data Processors (DP) throughout this document. Each DP has 4 megabytes of memory (8 gigabytes in the entire system). A sequencer mediates between the front-end and the parallel processing unit. FIG. 2 shows a simplified system configuration diagram. It leaves out the details of how multiple front ends can simultaneously control different sections of the CM-2.

The term PE (processing element) in the CM-2 can be interpreted in two different ways. In the Paris or fieldwise viewpoint, each PE is a bit-serial processor, and there are 64K of them. Each bit-serial processor has 128 kilobytes of memory. Every 32 bit-serial processor shares a single FPU and a transposer to convert between the bit-serial fieldwise representation of a number and an word-based slicewise representation. The alternative view, which is used by CM Fortran 1.0 (Thinking Machines Corporation *CM Fortran Reference Manual Version* 1.0 Cambridge, Mass. 02142 (1991), is that each PE is a unit containing a DP and associated memory, there are 2K PE's in the machine, and all data is stored in the word-based slicewise representation. Each PE is both superpipelined and superscalar.

Note that the slicewise compiler does not make any use of the bit-serial processors. This acceptable because efficient usage is still being made of the underlying silicon. Not counting memory, each DP along with its associated bit serial and routing hardware contains approximately 145,000 gates. Of this, 40% are devoted to the FPUs and only 5% to the bit serial processors. Although our new compilation techniques sacrifice 5% of the gates, the payback is that 40% are used with much higher efficiency than before.

B. Target Machine Description

Figure 3:
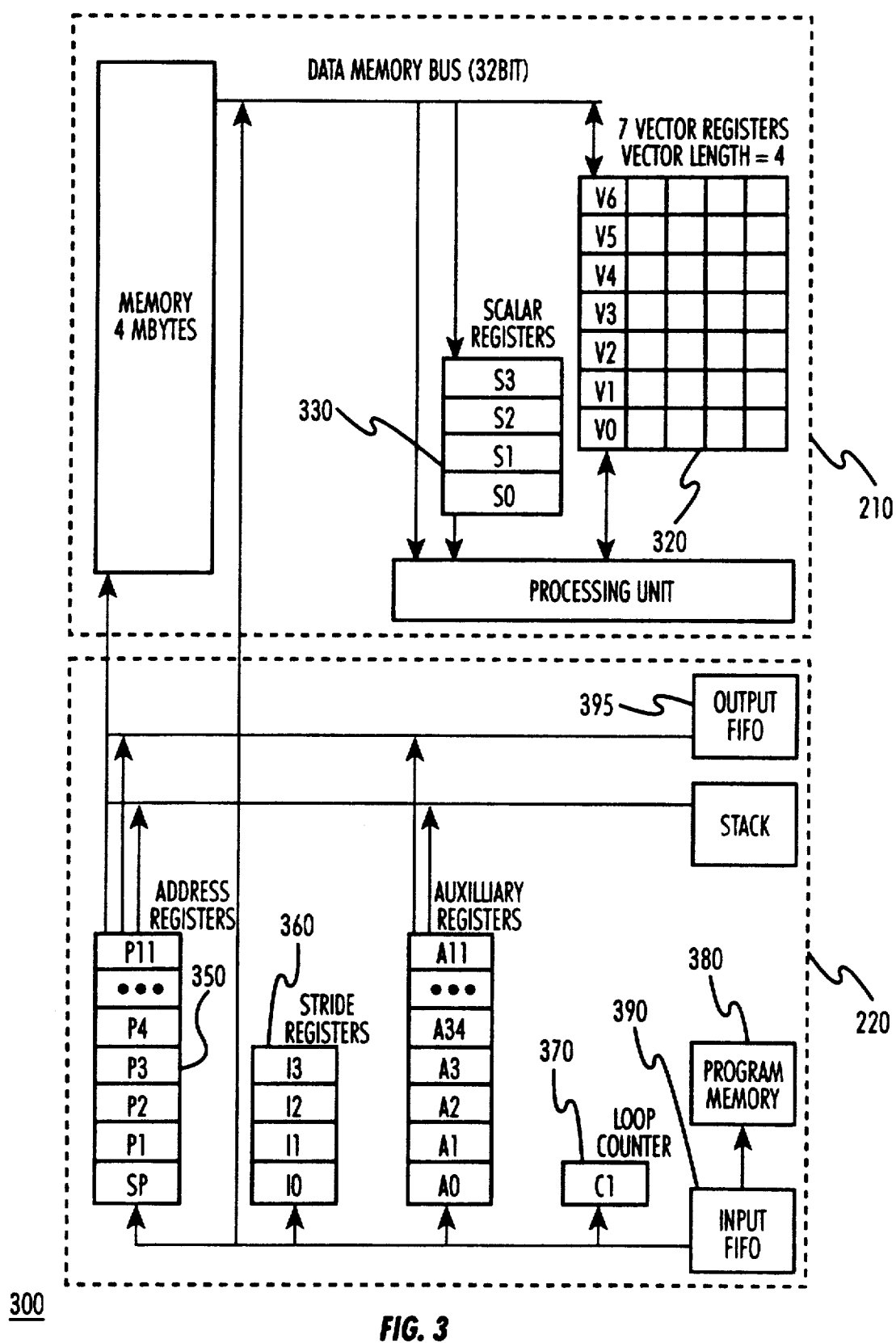
FIG. 3 shows a architectural diagram of a sequencer and a single processing element.

FIG. 3 illustrates the architecture of the PE 110 and sequencer 120 as viewed by the compiler. No communication hardware (routers, reduction, broadcast, etc.) shows up in the diagram because communication hardware is not currently exposed to the compiler; the run time library handles all communication. Referring to FIG. 2 and FIG. 3, from the point of view of the slicewise compiler, the CM-2 target machine has the following specifications: 2048 64-bit PEs 210, 4 megabytes of memory 215 per processor (1 single precision megaword), 7 vector registers 320 per PE, each of length 4, 4 scalar registers 330 per PE, and sequencer processor 220 controls the PEs A vector length of b 4 was selected on the basis of several benchmwarks. Using a longer vector length would allow the overhead of instruction delivery to be amortized better, but since the pool of DP registers available is fixed, there would be fewer vector registers with a longer vector length. Reducing the number of registers available increased register spills and decreased performance on the benchmark codes.

A vector architecture is used rather than using software pipelining techniques in a scheduler because of the cost of delivering instructions to the PEs 210. Instruction delivery to PEs 210 takes two cycles; one for the opcode, and one for the registers. By using vector instructions, we can in effect delivery an instruction per cycle, because the opcode does not have to be chanted. The time needed for instruction delivery, combined with the vector length of 4, results in a best obtainable slicewise speed of 14 gigaflops, which can be achieved on polynomial evaluation. The hardware's peak of 28 gigaflops can only be obtained with a longer vector length.

Sequencer 220 is a controlling processor that drives the PEs 210. It has a number of address registers 350 that point into the memory 215 of the PEs 210. For example, such a register might point to the beginning of the data for a parallel variable B. One of these pointer registers is reserved by the compiler for use as a parallel stack pointer. Sequencer 220 has stride registers 360 which can be used to walk over non-contiguous values (such as an array section that contains every other element of an array, like a (1:N:2)). Sequencer 220 also has a number of scalar registers, including a conventional stack pointer into its own memory, a loop iteration counter 370 for controlling looping over arrays of data, and memory 380 to contain the compiled PE program. Sequencer 220 uses FIFOs 390, 395 to communicate with the front end that controls the CM-2.

From the compiler's point of view, the PE/sequencer 300 is replicated 2048 times in a full size CM-2, although in fact only the PE (the upper half of the figure) is physically replicated, and the point-to-point lines delivering instructions and data to it from the controlling sequencer 220 are actually hardware fan-out trees that broadcast the required information from sequencer 220 to all 2048 PEs.

Sequencer 220 executes a language called PEAC (Processing Element Assembly Code). PEAC is a load-store RISC-like instruction set that includes vector instructions, and was created for use with the slicewise compiler. It has one addressing mode and about 50 instruction opcodes. It must be assembled into CM microcode for execution, and as a result a single PEAC instruction can take more than 1 cycles (hence the term RISC-like). Of course, there is no reason why a machine could not be designed from scratch to execute PEAC directly. For a more in depth discussion of a low level programming language that uses vector instructions see co-pending patent application entitled "System and Method for Compiling Towards a Super-Pipeline Architecture", which was cited above. There is nothing inherent about the parallel vector machine model that requires that the PEAC instruction set be used. Any low-level instruction set that contains vector instructions can be used with the present invention.

Below is a section of code which includes two PEAC vector instructions:

FLODV [P12+offset]stride++, V5
FMULV V5 V3 V7

The first instruction takes the pointer register P12, adds offset to it, and causes each PE to load in parallel the next 4 values form the pointed-to location in its local memory (separated by stride). Each PE places the four values that it loads into its vector register V5. The pointer register is then auto-incremented by the ++, in preparation for execution over the next four values later use. This a common idiom because PEAC code is usually executed from inside of a strip-mined loop that walks over a vector with a length much larger than 4 per PE. The second instruction causes each PE to take the four values in its vector register V5, multiply them by those in V3, and produce 4 values that are then stored into V7.

The CM-2 hardware allows a DP instruction to be chained to an instruction that loads or stores data to or from the DP registers. PEAC and the PEAC Assembler accommodates this by allowing two instructions, one a calculation and the other a load or store, to be specified on a single line of source code, indicating that they are to be overlapped. The semantics of the overlap are those of chaining: it is as if the load was executed followed by the calculation. In the case of an overlapping store, it is as if the calculation was executed followed by the store. Thus, for the PEAC example above, the two instructions can be overlapped even through the multiplication uses the results of the load.

Note that the slicewise CM-2 is the same piece of hardware as any other 64K CM-2, it is only the view of the hardware that has changed. Instead of 32 registers per DP, there is 7 vector registers 320 plus 4 scalar register per DP. Instead of a huge number of processors, each with a small amount of memory, the slicewise DM-2 has many processors, each with a large amount of memory. This change in viewpoint, even without the other improvement of the slicewise compiler (reduced waste of memory bandwidth) can change the performance properties of algorithms.

For example, consider the fact that each basic processing unit now has 4 megabytes of memory rather than only 128K. Suppose an application has to look up data in a large table for each element in an array, and suppose that the table has 100,000 entries. The Paris model would spread this data out among the processors and require an expensive (in time) communication call to access it. With the slicewise view of the machine, one can store a copy of the entire table in every PE, allowing fast local lookup. This is important, because local lookup can be 100 times faster than general interprocessor communication on the CM.

C. Parallel Array Layout

Array layout is handled by functions in the CMRT run time library. Because layout is not handled at compile time, a user can run a compiled program on any size of Connection Machine; the run time library takes care of the fat that the array layout will be different when different numbers of PEs are available. For a more in depth discussion of the CMRT run-time library see copending patent application entitled "System and Method for Mapping Array Elements to Processing Elements."

Figure 4:
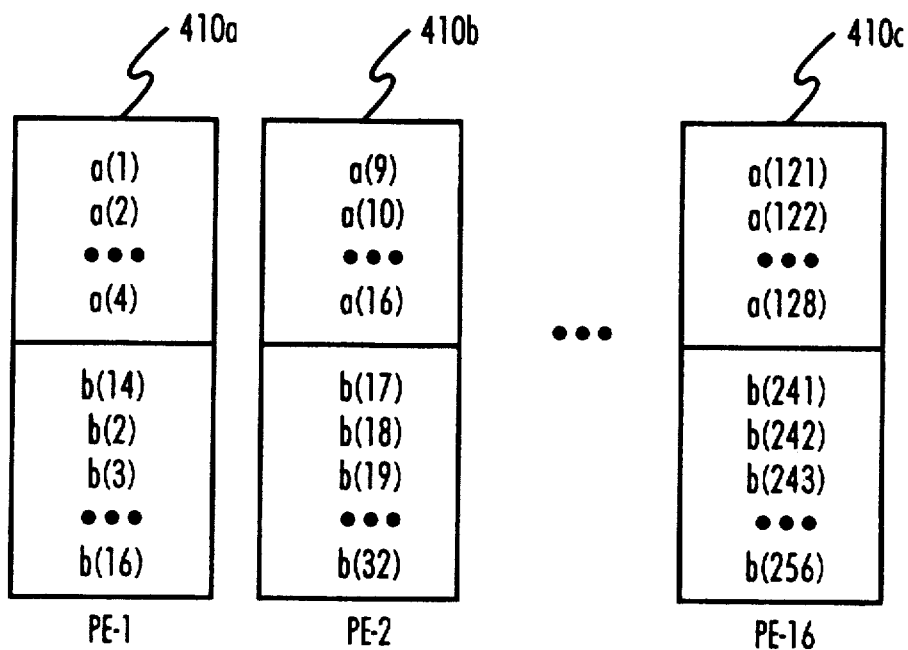
FIG. 4 shows an example of mapping two one dimensional arrays onto sixteen PE machine.

Arrays re canonically laid out by mapping equal sized subgrids of arrays onto the parallel processing elements (PEs) of the CM. For example, FIG. 4 illustrates the allocation of two one-dimensional arrays onto a machine with 16 PEs 410. In this simple case, the machine itself is treated as a one-dimensional array of length 16 containing PEs, and equal sized one-dimensional subgrids are assigned to the processors. This canonical layout has a number of implementation and performance consequences. Execution of an entirely elemental statement, such as one that adds 1 to each element of A, becomes a simple matter of giving each PE a vectorized loop to perform the required local computation on its subgrids. However, a statement like A = A + B(1:128) requires communication to align its operands. The reason is that the 128 elements of A are spread among at 16 processors, while the first 128 elements of B, which is 256 elements long, are concentrated in the first 8 processors. Directives are available to describe non-canonical layouts, which are useful in performance tuning.

Figure 5:
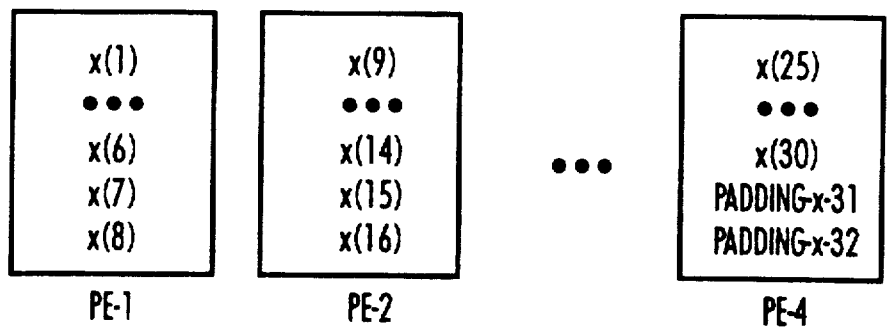
FIG. 5 shows an example of mapping an array X of size 30 onto a 4-PE machine.

A special case of array layout occurs when the number of elements in an array is not a multiple of the number of PEs. It is a special case because on a SIMD (single instruction multiple data) machine, instructing the "extra" processors to turn themselves off when operations are performed on the small array is itself an operation that takes time to perform. By handing small array specially, the compiler avoids these operations altogether. The small user array is simply mapped onto a larger machine array, the machine array contains extra padding elements, as shown in FIG. 5. The result is that all processors have equal sized subgrids to work on, but some of the subgrids contain padding rather than actual data. Elemental calculations can take place in all array elements, including the padding elements. Performing calculations on the padding is an optimization because those extra processors have nothing better to do with their time. Since by their very nature, elemental calculations are localized to elements, calculations on padding data have no effect on the calculations on the user's real data, but any floating point errors that arise from calculations on the padding data must be ignored or masked out. Communications functions, however, must carefully skip over padding data; it cannot be allowed to generate spurious interprocessor messages.

D. Slicewise Data Layout

Figure 6:
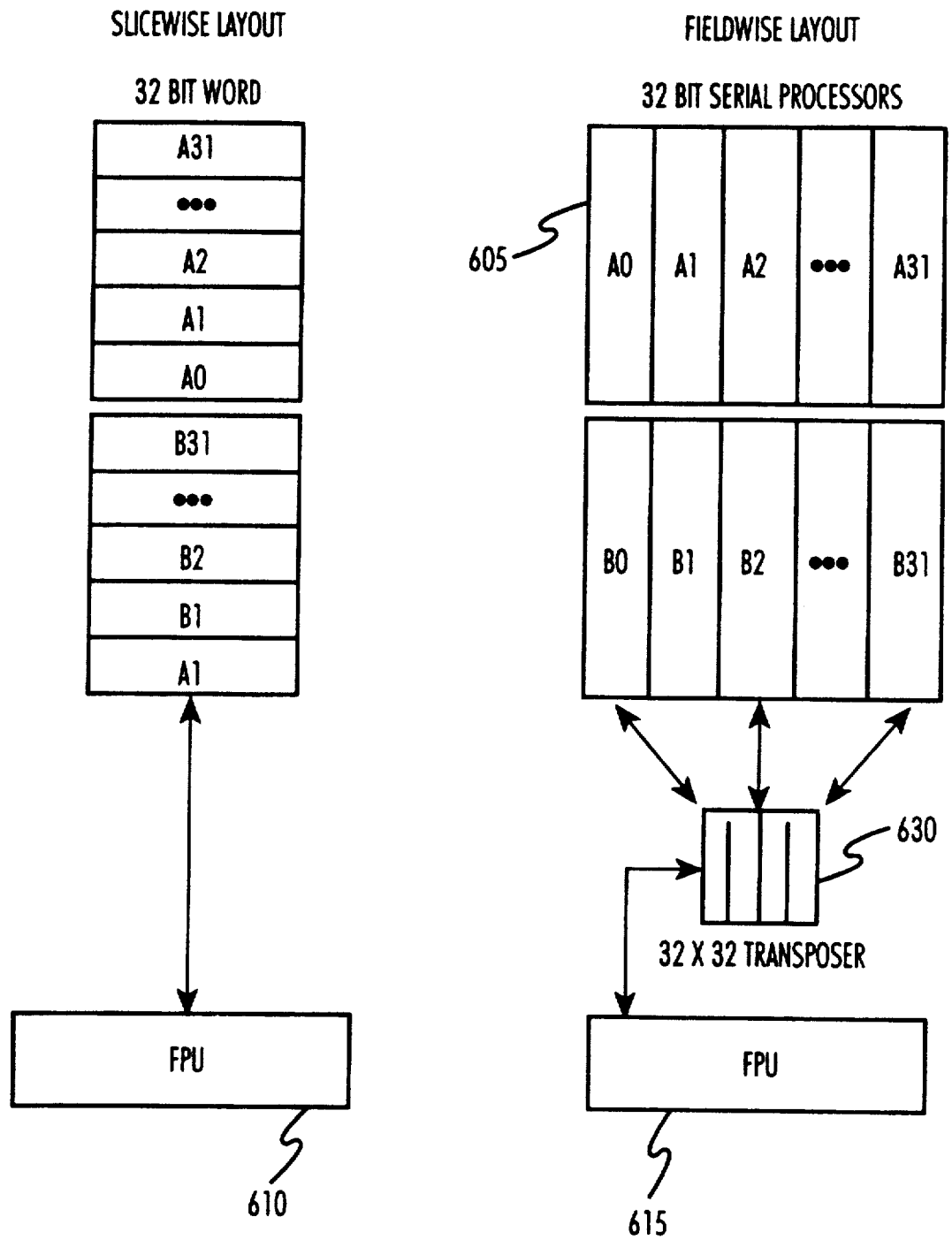
FIG. 6 shows a slicewise versus a fieldwise layout.

FIG. 6 shows two different types of data layout: slicewise and fieldwise. In the slicewise layout, data is stored in a form that makes it easy for DP 610 to load or store a floating point number in a single cycle. This format puts each bit of a 32 bit floating point number in a different bit-serial processor. The fieldwise approach, however, stores data in a seemingly inconvenient form; all of the bits of a floating point number are stored with a single bit-serial processor 605. The fieldwise form allows efficient bit-serial computation, but because bit-serial processors can only output 1 bit at a time, they cannot write fieldwise data directly to DP 615. In order to use DP 615 on fieldwise data, fieldwise languages like Paris must convert data into slicewise form, perform a floating point computation, and then convert the data back into fieldwise form.

The conversion operation is transposition, which is performed on a $32 \times 32$ square block of boolean bits by transposer 630. Each of the 32 bit serial processors 605 can write into a separate column of the transposer 630 hardware. They do this in parallel, but since they are bit serial processors it takes 32 times steps. Once transposer 630 is full, DP 615 is free to read out various rows, each of which contains a complete floating point number. The inverse operation converts from slicewise format to fieldwise format.

Note that this time consuming transposition operation is only necessary as a prelude to using DP 615 on data when the native data format is stored fieldwise. By ignoring the bit-serial processors 605 and always using a slicewise memory format, DMF 1.0 avoids the conversion step. It gains a number of other advantages as well, which are outlined below.

Paris operations requires user arrays to be at least 64K in size to even activate all DPs at a low level of efficiency. (About 8 times as many numbers are needed to cover up various overheads such as transpose time.) This 64K size corresponds to 1 number per bit-serial processor. On the other hand, slicewise can activate all DPs simply by having a number per DP: an array of size 2048.

E. DP Register Utilization

Below is a simple section of elemental code which must be mapped onto the DPs and processors of the CM:
  real array (131072) :: a,b,c,d
  a = a + b
  b = b * d
The program involves four large one-dimensional arrays, each containing 131,072 elements. The first line of the program adds array B to array C elementwise, storing the result into array A. The second line is similar, only it multiplies B and D and stores the result in B. The compiler performs scalarization and loop fusion in order to make efficient use of the DP registers.

FIG. 7 illustrates the work performed by the output of the slicewise compiler on the PEs of the CM-2. There are 2048 PEs available, and the array layout functions have given each PE 63 elements of each of the 4 arrays. In effect, PE-1 710a can simply loop from 1 to 64, and on interaction i it works on elements A(i), B(i), C(i), and D(i). The slicewise compiler actually generates vectorized loops with a loop increment of 4 rather than a scalar loop with an increment of 1. Thus, only 16 iterations through the loop are needed to handle 64 elements, and the various DP instructions operate on vectors and thus can be pipelined to cover up overhead. The Paris implementation makes similar use of vectors, but its vectors are of length 32 because that is the length that the transposer handles. However, for simplicity, the loops shown in FIG. 7 through FIG. 10 are shown as ordinary scalar loops with a loop increment of 1 rather than as vector loops.

The first instruction in the loop body loads B(i) into a DP register, R0. The second instruction overlaps the load of C(i) and its addition with R0 into R1. Next, the result of the addition is stored out to B(i), and execution of the first the two Fortran statements for iteration i has been completed. The code to execute the second statement comes next.

Since R0 already contains the value of B(i), there is no need to reload it. Instead, D(i) is loaded and the load is overlapped with a multiply by R0. Finally, the result is written out to B(i). This code has taken basically 5 instruction times (1 load, 2 stores, and 2 FLOPS) to accomplish two FLOPS.

Compare this to the computations required when DP registers are not exposed to the compiler, as is the case with the Paris instruction set used by the fieldwise compiler. As the code in FIG. 8 illustrates, Paris must contain a loop to walk over the local data. Since this loop is in a runtime Paris function and is not visible to the compiler, it cannot be merged with other nearby loops. Each Paris instruction is memory to memory. All of the arguments on the right hand side of each instructions must be loaded into the transposer and then be streamed past the DP. The result array produced by the instruction must be completely written to memory before the next Paris instruction can be executed. No DP register values can be passed between Paris instructions.

In the abstract case shown in the figure, four loads, two stores, and two FLOPS are required. Thus, three extra loads are required compared to the slicewise version of this program. This is the roof motivation for the slicewise compiler; fieldwise programs are always memory bandwidth bound.

An interesting side effect of this is that Paris computation on double precision values takes about 2 times longer on double precision numbers as on single precision numbers, because every computation requires three memory operations (two loads and a store), and memory operations on double precision quantities take two memory access cycles. However, slicewise DP compute time on double precision values is the same as for single precision values, because the DPs are 64-bit processors. Typical elemental code blocks include far fewer than three memory operations per DP operation. So even after memory cycles are counted, slicewise double precision calculations end up taking only around 1.3–1.6 times as long as single precision calculations.

Thus, the parallel vector machine model has removed the memory hierarchy by going to a courser grain model. This improves performance. The vector processor model eliminates the gaps between the data, as opposed to the large gaps that appeared in the virtual processor model. Second, the register files can now be utilized. Previously, the register files were only used as a buffer to store the data for one iteration since very statement was a in essence a DO loop. Now we have more statements inside the DO loop. Thus, instead of running at the memory bandwidth, the machine is running at the register file bandwidth, and by utilizing the register files on the CM-2, for example, the processor speeds can be increased by a factor of two.

The compiler implements the parallel vector machine model by generating a DO loop and strip mining it to map it onto the vector machine. Strip mining is the generation of code such that each vector operation is done for a size less than or equal to the maximum vector length defined by the machine. For a detailed explanation of strip mining see Loveman, D. B., "Program Improvement by Source-to-Source Transformation," J. of the ACM, Vol. 20, No. 1, pp. 121-145. (January 1977).

F. DP Memory Utilization

Below is a one-line section of elemental code which must be mapped onto the DPs and processors of the CM:

a=b+c+d

This program involves the same arrays as the previous example, but now three arrays are being added and the result gets stored in the fourth.

FIG. 9 illustrate show this code is mapped onto the PEs of the CM by the slicewise compiler. The first operand is loaded, then the next two are loaded and overlapped with two additions, and finally the result is written out. Compare this to the Paris equivalent in FIG. 10. Since the largest Paris instructions have two input operands and one output operand, the compiler must introduce a temporary T to handle the program which adds three numbers into a fourth. This T must be a full sized array in memory, so it therefore takes up 64 words per PE, or 131,072 words when totaled across all PEs. This increases the memory used by this simple program by 25%, and wastes memory bandwidth on storing and loading data that the user never asked to have stored or loaded.

The equivalent temporary for the slicewise program was the register R1, which has none of the memory wasting properties. Note that even if a register like R1 had to be spilled (and this is a rare occurrence), only 4 values (the vector length) would have to be spilled per PE, or 8,192 totaled across all PEs. This is obviously preferable to spilling the entire user array.

III. The Parallel Vector Machine Model

As is apparent from the above discussion, the fundamental idea behind the parallel vector machine model is to have a machine that has a collection of vector processors each with its own interface to memory. Vector machines provide high-level operations that work on vectors— linear arrays of numbers. A typical vector operation might add two 64-entry, floating point vectors to obtain a single 64-entry vector result. The vector instruction is equivalent to an entire loop, with each iteration computing one of the 64 elements of the result, updating the indices, and branching back to the beginning.

Vector operations have several important properties. The computation of each result is independent of the computation of previous results. A single vector instruction specifies a great deal of work—it is equivalent to executing an entire loop. Thus, the instruction bandwidth requirement is reduced. Vector instructions that access memory have a known access pattern. If the vector's elements are all adjacent, then fetching the vector from a set of heavily interleaved memory banks works very well. The high latency of initiating a main memory access versus accessing a cache is amortized because a single access is initiated for the entire vector rather than to a single word. Thus, the cost of latency to main memory is seen only once for the entire vector, rather than once for each word of the vector.

Moreover, vector machines can pipeline the operations on the individual elements. The pipeline includes not only the arithmetic operations (multiplication, addition, and so on), but also memory accesses and effective address calculations. In addition, most high-end vector machines allow multiple vector operations to be done at the same time, creating parallelism among the operations on different elements.

However, not all machines are designed to center around the vector processor (e.g., the CM-2). The present invention provides a compiler that compiles a source program written in an array-based language (e.g., CM Fortran 1.0) onto a parallel vector machine model. Array-based languages are fine-grained (i.e., they are designed to allow operations and/or manipulation on individual bits of arrays), when the grain size or granularity is the average task size, measured by the number of instructions currently being executed. Fine-grain languages allow the user to subscribe to the parallelism inherent in their application. Fine-grain languages have conventionally been mapped onto fine-grain hardware. The parallel vector machine model went beyond that, by first asking: why does the hardware have to be fine-grained? It is in fact advantageous to use a course-grained hardware which by its very nature is more powerful. Consequently, the present invention maps the fine-grained array-based language, in the CM-2 example CM Fortran 1.0, onto the course-grained vector processor hardware.

Array languages have been mapped onto vector machines (i.e., course grained hardware). However, these machines contained only single vector processors (e.g., CDC Cyper 205 and Cray 1). Moreover, some machines took the Paris type of approach in mapping array languages onto the hardware. However, if the designer wants to get better performance, a different model of the machine is required.

As stated above, the CM-2 is a massively parallel, superscalar, superpipelined machine. Most computer architectures typically do not have all three of these characteristics at once. However, since the parallel vector machine model is so general, the teachings of the present invention can be applied to a variety of different machines. The only requirement is that the target hardware have access to vector processors, or pipeline processors that can be configure to operate like vector processors. Currently on the market are a variety of different hardware models that can operate with array-based languages, regardless of whether the target hardware was originally designed to operate with such a language. The parallel vector machine model allows these same hardware configurations to operate more efficiently with the array-based language, then without the model.

Figure 13:
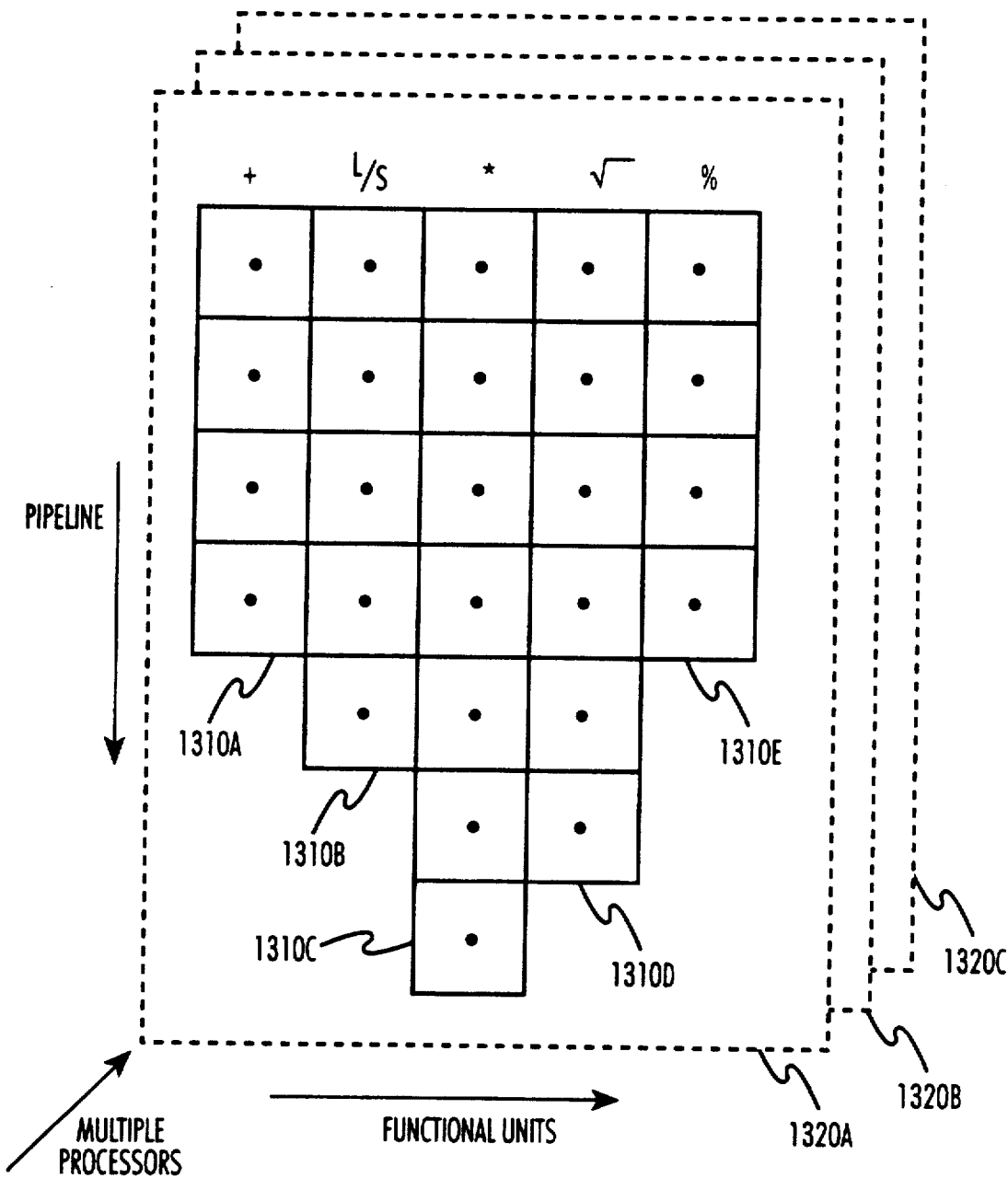
FIG. 13 shows an example of the three levels of parallelism that exist in the CM-2.

Referring to FIG. 13, a general illustration of the principle idea behind the present invention is shown. A plurality of processors 1320a, 1320b, 1320c are shown. There can be any number of processors (e.g., the CM-2 has 2K FPUs). Each processor 1320 has a plurality of functional units. Only five functional units 1310a–1310e are shown for simplicity. However, the present invention contemplates using any number of functional units. Each functional unit 1310 is pipelined, and as such, each functional units 1310 takes a different number of cycles to execute. For example, the add takes less cycles then a load store operation. Heretofore, compiler designers tried to manipulate the pipelines in the functional units to try and compensate for the difference in cycle time for different instructions. Efficient utilization of the functional units pipelines results in faster processor speeds. The object is to keep every "box" in the pipeline busy.

The parallel vector machine model solves this problem by treating each functional unit as if it had a length equal to the longest pipeline. For example, in FIG. A the multiply (*) functional unit a pipeline that is seven units deep. Thus, all five functional units will be treated as if they were seven units deep. The effect of this is that the machine will lose some of the efficiency due to the lengthening of the pipeline down the pipeline, but it gains because of the efficient use of the functional units.

Typically, the goal of designing a processing mechanism is to try and design an architecture that will allow the individual processors to run at the highest possible speeds. One common problem is memory bottlenecking. Transferring data between the processors and memory takes time. The more memory transactions that are necessary the slower the machine will be. The CM-2 can only transfer four bytes of data from the processors to memory per cycle. The only way to break this bottleneck is with caches or with registers. The present invention decided to break the bottleneck problem with registers. The present invention could be implemented with caches, however, caches can not be controlled as easily as registers.

Although the use of registers aided in solving the problem of memory bottlenecking other problems arose. To begin with memory latency was a considerable problem. The target machine went from a model that did not have any resisters to a model that did have registers. As a consequence, a number of actions had to be taken. To begin with, the present invention strip mines the do loops. Second, a new low-level instruction set that include vector instruction had to be developed.

In essence, the present invention is a virtual model of a machine. The present invention maps fine-grain array operations onto a course-grain hardware. The processors are complicated processor with multiple functional units and multiple pipelines. As stated above the idea behind the parallel vector machine model is to go beyond the memory bottleneck of an individual processor, while at the same time, distribute the data so that the machine can utilize all of the individual processors simultaneously.

The run-time system deals with distributing the data from the source program across the different vector processors. The data can be distributed at compile time. A small block of data is stored in every vector processor. The compiler views the hardware associated with the target machine as a collection of vector processors. Thus, each vector processor has a portion of an array mapped onto it. The present invention allows the development of a programming language that programmers can write in easily, while still making efficient use of a variety of different types of hardware.

There is nothing inherent about the parallel vector machine model that inhibits it from distributing the data at compile time. All that is required is to have a mechanism for telling the compiler how many processors are in the system. For the most part, it can be done at compile time. However, if the array size is unknown at compile time, then the data must be distributed at run-time.

The parallel vector machine model is a superior model than the Paris model, because it allows the pipeline aspects of the processor 1320 to be exploited. A pipelined processor allows the latency for one operation to be hidden, so long as the processor is working with multiple operations. If the pipeline is to deep there are drawbacks. For example, in the CM-2, the pipeline is a function of the number of registers. Thus, as the pipeline gets deeper, the user has access to less vector registers. Consequently, the preferred embodiment of the present invention uses a pipeline of size four.

The parallel vector machine model is a substantially superior for array languages, as opposed to the virtual processor model, because in the virtual processor model it is impossible to utilize the register files inside the floating point units since only one register file was shared between 32 bit-serial processors. Thus, the virtual processor model is limited by the memory to memory transactions that need to take place. The virtual processor model is fine if the target machine has a very fast memory, but if does not, and the designer wants to go beyond the memory bottleneck, the register files (or a cache) must be utilized.

Thus, the present invention is doing many things. It exploits the parallelism across the vector processors and utilizes the register files within the vector processors. The parallel vector machine model allows the machine to hide the memory latency, hide the latency of the delivery of instructions, go beyond the memory bottleneck, and utilize the multiple functional units in chaining the operations between instruction. By mapping blocks of the arrays onto the course grain hardware, the memory hierarchy is removed.

The teaching can be applied to a variety of different hardware configurations. It is by no means limited to the hardware of the CM-2. For example, the Intel i860 microprocessors, which is essentially a scalar processor, can utilize the teachings of the present invention. A compiler can be built to generate the PEAC assembly language or an equivalent low level assembly language with vector instructions for the i860 microprocessor. Thus, treating the scalar processor as a vector processor.

IV. Compiler Structure

Figure 11:
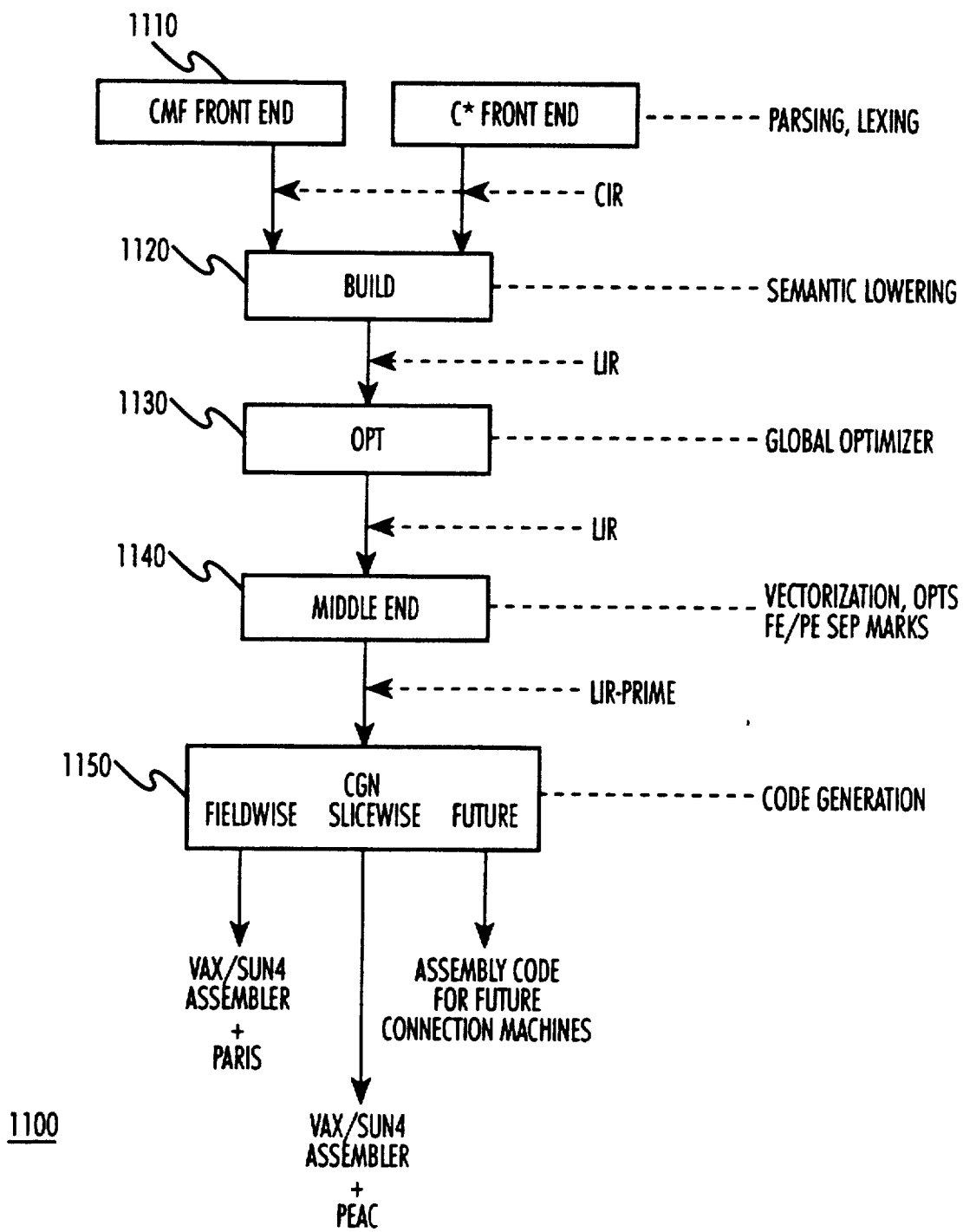
FIG. 11 shows the structure of slicewise compiler 1100 through code generator 1150.
Figure 12:
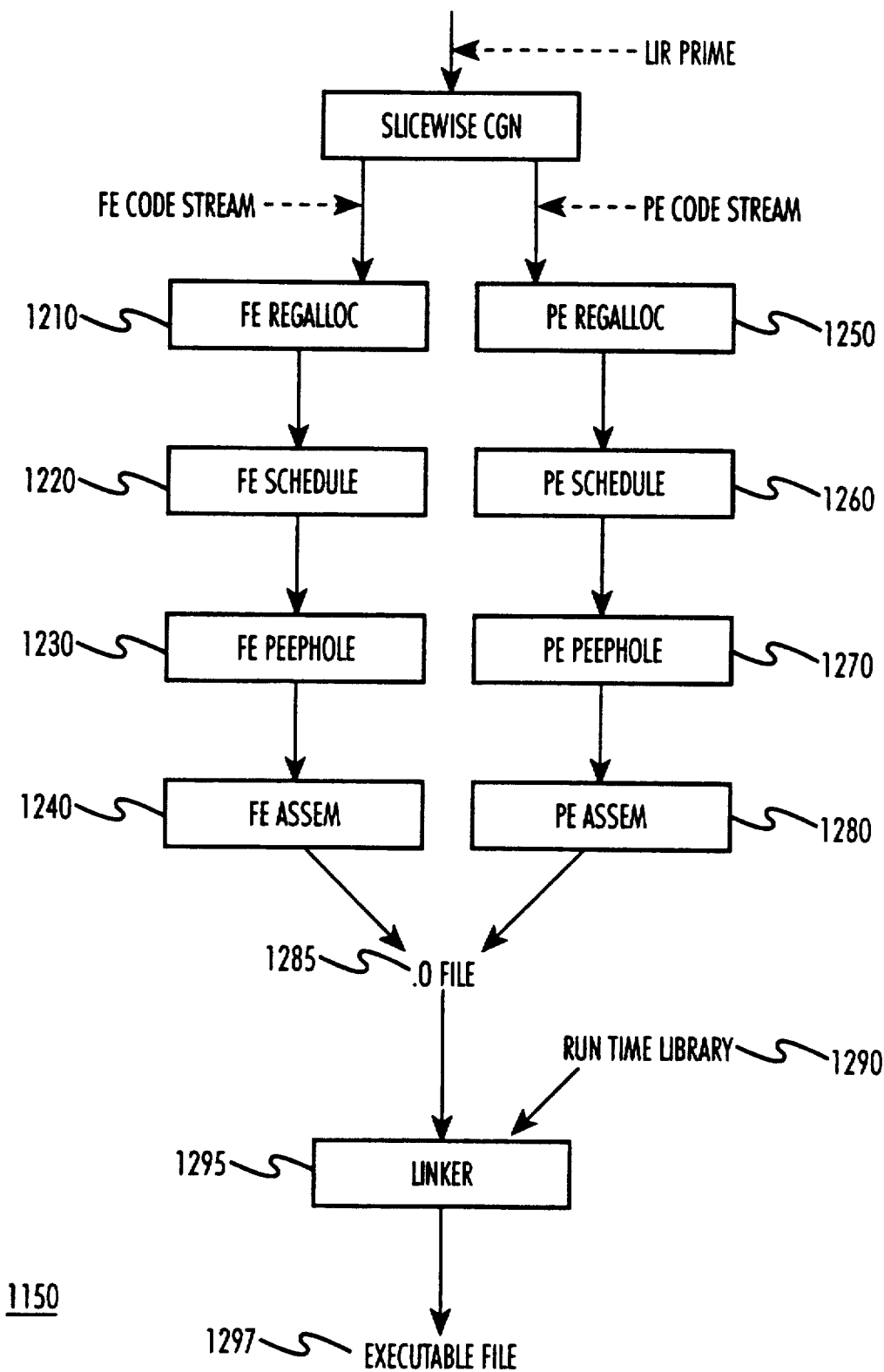
FIG. 12 shows an illustration of the slicewise code generator 1150.

FIG. 11 illustrates the structure of the slicewise compiler 1100 up through the Code Generator 1150. The compiler can accept multiple input languages; this discussion focuses on CM Fortran (CMF). The compiler can output three types of code; this document focuses on the slicewise output (i.e., PEAC assembly language). FIG. 12 shows the structure of the slicewise code generator 1150 through the generation of an executable Unix file.

The Fortran Front End (FFE) 1110 of the CMF is built with a compiler building tool called FEAST that work much like yacc and lex (available from UNIX). It parses the input program 1105 into an abstract syntax tree, performs semantic analysis to annotate the tree with type information and build up a symbol table, and also performs error check. The output is a tree structure called Common Intermediate Representation (CIR). Its structure reflects the syntax of the user's code.

A build phase of 1120 of compiler 1100 performs a bottom up walk of the CIR syntax tree, and outputs a graph structure (rather than a tree) called LIR (lowered Intermediate Representation). The LIR reflects the semantics of the user code, rather than the form. For example, although the CIR might reflect simply an assignment statement that adds two array sections together, the LIR might involve communication to align one section with the other, a numeric type conversion from integer to real, addition, and perhaps communication to send the result to the target array section. The LIR produced by Build 1120 for parallel computation consists of nodes that call for computation of whole arrays: no vectorization is performed by this phase.

Build 1120 inserts explicit nodes to perform communications where it needs to align arrays and/or array sections that have different array layouts. It chooses among a large number of communication functions to do this, attempting to pick the least expensive combination. Build 1120 also has the freedom to choose where (in which processors) to perform a parallel computation; normally it will compute in a layout that is identical to one of the operands or to the target destination.

Build 1120 contains a Local Optimizer which performs a number of classic scalar optimizations within basic blocks, including common subexpression elimination, copy propagation (of constants, variables, and expressions), constant folding, useless assignment elimination, and a number of algebraic identities and strength reduction transformations.

The Global Optimizer 1130 is an optional phase which performs standard compiler optimizations like copy propagation, strength reduction, and dead/useless code elimination just like the Local Optimizer in Build 1120, only it operates on the compilation unit as a whole and can move code between basic blocks (see Chow, F. C., A portable machine-independent global optimizer-design and measurements, Technical Report No. 83-254, Stanford University, Computer Systems Laboratory, Stanford Calif. 94305-2192 (1983)). It also performs code motion in order to move computation, loads, and stores out of loops, partial redundancy elimination on multiway branches, hoisting of duplicated code out of conditionals, and so on. The output of Global Optimizer 1130, like its input, is an LIR.

The purpose of Middle End 1140 is to map the LIR, which operates on arrays as monolithic, indivisible units, into the more detailed LIR' (LIR prime). LIR' induces explicit code to loop over the elements of an array's subgrid. The LIR' also marks which code will be running on the front end processor, and which code will run on the sequencer/PEs of the CM-2. This simplifies the jog of the slicewise Code Generator 1150, which must produce SPARC or VAX assembler for the front end and PEAC assembler for the sequencer/PEs.

Middle End 1140 makes use of a simplified, conservative form of dependency analysis. In a serial Fortran loop, a dependency occurs when a value produced during one iteration of a loop is needed by another iteration, or when one iteration overwrites a location whose old value is needed by some other iteration. Dependencies inhibit parallelization. Therefore, a compiler that relies upon automatic parallelization of scalar loops must perform an accurate dependency analysis rather than an overly conservative analysis, or it will not find anything to parallelize.

However, the CMF compiler 1100 does not yet parallelize scalar loops. Rather, it only utilizes the parallelism that is explicit in Fortran 90 notation. An overly conservative analysis does not inhibit parallelization, it merely means that an additional subgrid loop will be required, which increases overhead and decreases the range over which values can remain in DP registers. Thus, even if the compiler's analyzer always returned TRUE when asked if a dependency was present, the output code would not become serialized; at worst it would degrade to being much like Paris, with a separate subgrid loop wrapped around every operation.

Middle End's 1140 dependency analysis makes use of two simple rules: (1) any communication is a possible loop-carried dependency within the subgrid loop. Thus, a shift is conservatively treated as if it always resulted in a dependency, but adding two arrays together element wise is not a dependency; and (2) any scalar is a dependency.

The vectorized subgrid loops generated by Middle End 1140 (and, therefore, by compiler 1100) cannot contain dependencies. The end result is that the loops contain elemental code that operate on aligned arrays within a single array layout. Scalar code is handled by simply generating the appropriate front end code. Communication code is handled by calling the run time library function that will cause the CM-2 to perform the corresponding communication function.

Below in TABLE 1 is a sample source program which performs both elemental and transformational Fortran 90 operations on both one and two dimensional arrays. The source program will be used to demonstrate how Middle End 1140 processes this source code. The examples will be presented in a pseudo-LIR that is closer to Fortran source than to LIR, because it is far more readable.

TABLE 1

| |
|---|
| integer, array(1000) :: a,c |
| integer, array(20,200) :: z |
| result = 1 + cshift (a*c, dim=1,shift=1) |
| result = result * 2 |
| a = 0 |
| z = 0 |

The first step that Middle End 1140 takes is to eliminate dependencies from statements in order to create large regions of elemental code that can then be moved into the PEs. This is done by separating communication and scalar code from the dependency-free elemental code. Normally, new temporaries will have to be introduced. The code in Table 2 shows the result of this transformation (there does not happen to be any scalar code in this example):

TABLE 2

| |
|---|
| integer, array(1000) :: a,c,temp1,temp2 |
| integer, array(20,200) :: z |
| temp1 = a * c |
| temp2 = cshift(temp1, dim=1,shift=1) |
| result = 1 + temp2 |
| result = result * 2 |
| a = 0 |
| z = 0 |

Note that two new array temporaries have been introduced. temp1 is used to separate out the elemental computation that was buried within the csdhift communication, while temp2 is used to separate the computation that was performed on the result of the communication.

Next, in TABLE 3, Middle End 1140 begins to separate the code that will run on the front end from the code that will run on the sequencer. A new type of LIR node, the PECODE, signifies the point of separation between the two. The computation of array layout is shown explicitly as well in this table. (It was actually generated in Build phase 1120.) Although the PE code has been indented to the right, there is still only a single LIR graph data structure (not the matching of the closing PECODE parentheses).

TABLE 3

| CODE FOR FRONT END | CODE FOR PEs |
|---|---|
| shape1 = array-layout([1000]); | |
| shape2 = array-layout([20,200]); | |
| ...allocate space for parallel variables, then ... | |
| PECODE_1(shape1, | temp1 = a * c) |
| temp2 = cshift(atemp1, dim=1,shift=1 | |
| PECODE_2(shape1, | |
| | result = 1 + temp2 |
| | result = result * 2 |
| | a = 0 |
| PECODE_3(shape2, | |
| | z = 0) |

The final step in Middle End 1140 processing is to insert explicit code by which the sequencer communicates to the PEs the information needed to execute a PECODE block. Basically, this consists of the addresses of the parallel variables, the values of any scalar variables, the number of elements in the subgrid (which is a part of the array layout data structure at runtime), and a parallel stack pointer for register spills. This information is passed as part of a PE_FUNCALL node. This function invocation node names the PECODE that should be executed, and pushes the appropriate arguments into the FIFO pipe that connects the front end to the sequencer. The output of Middle End 1140 at this stage is LIR', a single data structure, but for clarity it is split into two separate figures. Table 4 contains the front end code, and Table 5 contains the PE code.

TABLE 4

```
shape1 = array-layout([1000]);
shape2 = array-layout([20,200]);
...alloc space, then ...
PE_FUNCALL(&PECODE_1,
    temp1, a, c, PE_SP,
    shape1->subgrid_size);
CMRT_CSHIFT(temp2, temp1, 1, 1);
PE_FUNCALL(&PECODE_2,
    result, temp2, a, PE_SP,
    shape1->subgrid_size);
PE_FUNCALL(&PECODE_3,
    z, PE_SP,
    shape2->subgrid_size);
```

TABLE 5

| PECODE_1: | POP_ARGS(temp1, a, c, PE_SP;<br>POP_loopsize(limit);<br>subgrid_loop(i=1, limit)<br>{ temp1[i] = a[i] * c[i]; } |
|---|---|
| PECODE_2: | POP_ARGS(result, temp2, a, PE_SP);<br>POP_loopsize(limit);<br>subgrid_loop(i=1, limit)<br>{ result = 1 + temp2;<br>result = result * 2; } |
| PECODE_3: | POP_ARGS(z,PE_SP); |

TABLE 5-continued

POP_loopsize(limit);
subgrid_loop(i=1, limit)
{ z[i] = 0; }

In effect, the basic work of Middle End 1140 illustrated above is to "detect" the parallel loops of Fortran 90 and to perform loop fusion and strip mining. A number of other optimizations are also performed.

One important optimization is the application of copy propagation within PECODEs. Both the Build phase 1120 and the Global Optimizer 1130 performed coy propagation, but only on scalar computations. The reason is that in general, full dependency analysis is required in order to make sure that copy propagation is a legal transformation. However, within PECODEs, there are guaranteed to be no loop-carried dependencies, so copy propagation within a single PECODE is always legal. In the previous example, Middle End 1140 would have performed copy propagation on the body of PECODE_2 as shown in Table 6, eliminating a store of result to memory.

TABLE 6 subgrid_loop(i=1, limit)
{ result = 1 + temp2;
result = result * 2; }
==> via copy propagation ==>
subgrid_loop(i=1, limit)
{ result = (1 + temp2) * 2; }

Another optimization that Middle End 1140 performs in order to increase the size of the subgrid loops is code motion: scalar code that sits between two blocks of elemental code will be moved out of the way, if the compiler can prove that the code motion will not violate any dependencies. This allows the two elemental blocks on either side of the scalar code to merge into one large block. The larger subgrid loop that results gives the PE Register Allocator phase 1210 and PE Scheduler phase 1220 (shown in FIG. 12) more opportunity for optimization. In keeping with the flavor of minimal dependency analysis, the compiler only moves scalar code that it inserted; user code is not moved. Examples of the kid of scalar code the compiler can move includes dope vector manipulation, allocation of space for parallel arrays, and allocation of array layout geometries.

Middle End 1140 performs an unmasking transformation which converts the Fortran WHERE statement into an explicit vector merge, using vector versions of bit wise XOR, AND, and NOT to implement the masked array assignments in the body of the WHERE. This transformation allows the RHS of assignment statements in the body to be evaluated without a mask; it is only the assignment to a target that is masked. This is desirable because unconditional execution is faster on the CM-2 (and on many vector architectures) than conditional execution. It is legal for CMF to evaluate the RHS expressions in an unmasked manner because of the helpful semantics of Fortran 90: Fortran 90 does not contain a way for the user to express side effects on the RHS. If an array valued function call is on the RHS, it is defined by the standard to execute in an unmasked manner.

Finally, Middle End 1140 performs an optimization known as temporary compression, in which compatible array temporaries whose lifetimes do not overlap are merged into one. This saves memory, and also reduces the number of calls to allocate/deallocate routines.

Code Generator 1150 of the CMF compiler 1100 is based on PQCC technology (Leverett et al., *Computer* 13(8):38–49 (1980)). It performs a constrained pattern matching walk of the LIR' graph. When a pattern and its constrains match, an action that outputs appropriate code is fired. For example, if x and y are scalar floats that are in registers, a pattern will match as follows:

PLUS(x,y)
==>CGN outputs to scalar stream ==>
FADD Rx, Ry, R output

The fact that the output is available in Routput is added to the context of the PLUS LIR' node, thereby affecting the continued pattern matching of nodes.

The CGN produces two entirely separate code streams. All code other than that inside PECODEs is sent to a scalar code stream. The code sent to the scalar code is either SPARC or VAX assembler, except that the code assumes an infinite number of registers are available. A later Register Allocator phase will map these virtual registers onto the physical registers. Similarly, all code that is inside a PECODE is sent to a PE code stream in the form of virtual register PEAC.

The purpose of the four post code generator scalar FE phases 1210–1240 shown in FIG. 12 is to take the virtual register assembly code that is intended for execution on the front end and actually generate files containing object code for the front end. These PE phases 1210–1240 are fairly conventional.

The four post code generator parallel PE phases 1250–1280 shown in FIG. 12 take code intended for execution by the PEs (written in PEAC assembly code) and produce object files that can be downloaded into the CM-2 sequencer. The phases will be explained using the example Fortran and virtual register PEAC code in Table 2.

TABLE 7

```
real, array(10)::a,b,c,d,e,f,g,h,i,j
a = b+c+d+e+f+g+h+i
j = b*c*d*e*d*g*h*i
==> via CMF compiler, produce virtual register PEAC ==>
 1   flodv    [vP1:1+0]1 vV11:1
 2   flodv    [vP2:1+0]1 vV12:1
 3   faddv    vV11:1 vV12:1 vV13:1
 4   flodv    [vP3:1+0]1 vV14:1
 5   faddv    vV13:1 vV14:1 vV15:1
 ... etc., alternating loads and adds ...
16   fstrv    vV25:1 [vP9:1+0]1
17   fmulv    vV11:1 vV12:1 vV26:1
18   fmulv    vV26:1 vV14:1 vV27:1
19   fmulv    vV27:1 vV16:1 vV28:1
20   fmulv    vV28:1 vV18:1 vV29:1
21   fmulv    vV29:1 vV20:1 vV30:1
22   fmulv    vV30:1 vV22:1 vV31:1
23   fmulv    vV31:1 vV24:1 vV32:1
24   fstrv    vV32:1 [vP10:1+0]1
```

The Fortran program in TABLE 7 elementally adds a number of arrays together, and also multiplies the same arrays together. The PEAC code begins with two loads in lines 1 and 2, which load virtual vector registers vV11 and vV12 with the values pointed to by two virtual sequencer pointer registers vP1 and vP2. The offset added to the pointer is zero, and the stride between the pointed to values is one. Earlier POPS that are not shown had set those pointer registers to point to the beginning of the subgrid for a and b. Thus, a vector of 4 a values and 4 b values are loaded.

The third PEAC statement adds those values together. There follows a sequence of statements that alternately load another variable (c, d, e, etc.) and adds it into the sum. In line 16, a vector four sum values is written out. Lines 17–23 perform the multiplications specified by the user program. No loads are needed because all of the data has been loaded into registers already. The final PEAC statement stores a vector of four multiplied values.

The PEAC code is executed repeatedly as the core of a subgrid loop. On each execution is processes four of the elements of the subgrid, so if the subgrid is 16 elements long it will execute four times.

This PE Register Allocator 1250 phase accepts virtual register PEAC as its input and replaces the virtual registers with actual DP registers and sequencer pointer registers. Spill and unspill code is inserted as needed. Finally, the last use of each pointer register in the loop is converted to use autoincrement mode, so that the pointer is ready for use in the next iteration of the subgrid loop. TABLE 8 shows the output of PE Register Allocator 1250 for the same program.

TABLE 8

|   |       |                      |
|---|-------|----------------------|
|   | flodv | [aP2+0]1++ aV0       |
|   | flodv | [aP3+0]1++ aV1       |
|   | faddv | aV0 aV1 aV2          |
|   | flodv | [aP4+0]1++ aV3       |
|   | faddv | aV2 aV3 aV4          |
| ... |     |                      |
|   | fstrv | aVf [aP10+0]1++      |
|   | fmulv | aV0 aV1 aV4          |
|   | fmulv | aV4 aV3 aV0          |
|   | fmulv | aV0 aV5 aV1          |
|   | fmulv | aV1 aV2 aV3          |
| R | flodv | [aP7+0]1++ aV4       |
|   | fmulv | aV3 aV4 aV0          |
| R | flodv | [aP8+0]1++ aV5       |
|   | fmulv | aV0 aV5 aV1          |
|   | fmulv | aV1 aV6 aV2          |
|   | fstrv | aV2 [aP11+0]1++      |

PE Register Allocator 1250 uses a combination of "on-the-fly" register allocation with some intelligence about what values are needed at what point. This additional intelligence is of two forms: spill code is not generated for registers that contain values that are known to already be in memory, and exact next use information is calculated prior to register assignment. The reason that an on-the-fly algorithm produces acceptable code is that the structure of the PECODE is so regular and predictable: it consists of exactly one basic block, and the last statement is in effect a goto to the beginning (the PECODE is in the body of a subgrid loop). A more complex graph-coloring algorithm would probably not produce better output code because this simple algorithm has been so tuned to its relatively simple task.

Notice that the output now refers to the physical registers in the architectural diagram of FIG. 3. For example, the virtual vector register vV32 has been mapped into the actual vector register a V2, and the virtual pointer register vP2 has been mapped into the actual pointer register aP3. It turns out that there were not enough vector register to hold all of the user variables. As a result, two unspills were inserted, on lines marked with an "R". These unspills reload vectors into registers that had been temporarily preempted for some other purpose. Notice that no vector spills were inserted. PE Register Allocator 1250 almost always chooses to preempt values that already available in memory, so that it can unspill (or reload) the value without having to waste memory bandwidth on saving it.

PE Scheduler 1260 is an optional phase that takes the output of PE Register Allocator 1250 and transforms the code to overlap loads and stores. This generally results in a 30 to 40 percent increase in performance.

A classic compiler problem is determining which of the Scheduler 1260 and Register Allocator 1250 phases should run first. Each of two possible ordering has its benefits. If Register Allocator 1250 is run first, the spill and unspill code that is produces can be scheduled, which is important for performance when registers are in short supply. The slicewise architecture has 7 vector registers, which is a very limited number and leads to the use of many unspills for large expressions. However, in mapping independent virtual registers onto a smaller set of physical registers, Register Allocator 1250 introduces false dependencies which might prevent Scheduler 1260 from moving code and producing optimal output code. If Scheduler 1260 is run first, it can produce optimal code, but then the spills/unspills will not be overlapped.

The ideal solution is to combine both phases into a single phase, but this is not practical for this part of the compiler from a software engineering point of view. The combined phase would be too large and too complicated. Given the performance benefits of scheduling and overlapping the spill/unspill code, consequently, the preferred embodiment of the present invention chose to run Register Allocator 1250 first. However, in addition to the register-allocated PEAC, Scheduler 1260 receives as input retained information about the original virtual registers. This allows it to compute the true dependency information, and to undo false dependencies introduced by Register Allocator 1250, if necessary.

Table 9 shows the output of PE Scheduler 1260 for the sample program. Every load and store other than the first has been overlapped. In a sense, the register unspills that were inserted by PE Register Allocator 1250 turn out to be free, because they do not take away any resources that could be used for some other purpose. (No other loads could be overlapped even if the unspills were eliminated.)

TABLE 9

| flodv | [aP2+0]1++ aV0 | | |
|---|---|---|---|
| faddv | aV0 aV1 aV2, | flodv | [aP3+0]1++ aV1 |
| faddv | aV2 aV3 aV4, | flodv | [aP4+0]1++ aV3 |
| faddv | aV4 aV5 aV6, | flodv | [aP5+0]1++ aV5 |
| faddv | aV6 aV2 aV4, | flodv | [aP6+0]1++ aV2 |
| faddv | aV4 aV6 aV4, | flodv | [aP7+0]1   aV6 |
| faddv | aV4 aV6 aV4, | flodv | [aP8+0]1   aV6 |
| faddv | aV4 aV6 aV4, | flodv | [aP9+0]1++ aV6 |
| fmulv | aV0 aV1 aV4, | fstrv | aV4 [aP10+0]1++ |
| fmulv | aV4 aV3 aV0 | | |
| fmulv | aV0 aV5 aV1, | flodv | [aP7+0]1++ aV4 |
| fmulv | aV1 aV2 aV3, | flodv | [aP8+0]1++ aV5 |
| fmulv | aV3 aV4 aV0 | | |
| fmulv | aV0 aV5 aV1 | | |
| fmulv | aV1 aV6 aV2 | | |
| fstrv | aV2 [aP11+0]1++ | | |

The scheduling algorithm is a heuristic rule-based system. Subject to data dependencies, it is free to move instructions anywhere within the PECODE; it does not have to maintain ordering between code that came from different user statements as long as it can provide there is no dependence (input or output). This is relatively simple to do, since each PECODE consists of a single basic block which is looped over, and there are never any loop carried dependencies. Scheduler 1260 uses the virtual-to-physical register map information to provide the independence of loads and stores that use the same physical register but in fact arise from different virtual registers.

PE Peephole optimizer 1270 is an optimizer for locally improving the target code. Peephold optimizers generally improve performance of the target program by examining short sequences of target instructions (called the peephole) and replacing these instructions by shorter or faster sequence, when possible. See Aho, et al., cited above, pgs. 554–557.

PEAC Assembler 1280 is a table driven translator that takes PEAC and turns it into calls to CMIS (Connection Machine Instruction Set) microcode (Thinking Machines Corporation CMIS Reference Manual, Cambridge, Mass. 02142 (1990)). It hides the cumbersome details of CMIS, such as they way that the setting of the DP instruction opcode first takes effect several cycles after it is changed by a CMIS program, so the control of the DP opcode pins must be carefully interleaved with other code.

CM Run Time (CMRT) library 1290 provides the communication functionality that previously was available through Paris, but it operates on slicewise data. Object modules 1285 produced by CM Fortran compiler 1100 are linked with CMRT library 1290 in order to produce an executable file 1297. CMRT 1290 entry point functions are all on the front end, but the implementation of CMRT 1290 includes functions that run on the sequencer as well.

The first class of CMRT 1290 functions contains those that handle array geometries and thereby allow the mapping of arbitrary array shapes onto the CM-2. The second class includes communication between the front end and the PEs, including the calling of PECODE functions, scalar broadcast, parallel reductions to scalars, and the serial reading and writing of individual array elements. The third and final class includes the interprocessor communication functions, such as grid shifts and rotates, scans and spreads, and general permutation functions.

When a CM Fortran program is executed, the front end begins by calling a CMRT function to initialize the CM-2. Upon entrance to a subroutine, CM-2 memory is allocated for any arrays declared in that subroutine, and CMRT functions are used to create array geometries that map arrays onto the PEs. When a PECODE is called for the first time, the CMRT_FUNCALL function loads the CMIS microcode produced by the PE Assembler for that particular PECODE into sequencer memory and then invokes that microcode. If the sequencer runs out of memory, older PECODE microcode may be invalidated and overwritten (using an LRU algorithm) to create space.

As excellent description of numerous vectorization techniques, both conventional and new, is contained in Wolf, *Optimizing Supercompiler for Supercomputers*, The MIT Press, Cambridge Mass. (1989). The scheduling techniques are based on work in Gibbons et al., *Efficient Instruction Scheduling for a Pipelined Architecture*, Proceedings of the ACM SIGPLAN 1986 Symposium on Compiler Construction, SIGPLAN Notices 21.6, pgs. 11–16 (June 1986). Interactions between schedulers and register allocators are covered in Goodman et al., *Code Scheduling and Register Allocation in Large Basic Blocks*, Proceedings of the International Conference on Supercomputing pgs. 442–452 (July 1988), and treatment of groups of registers as vectors is discussed in Jouppi et al., *A Unified Vector/Scalar Floating Point Architecture*, Architectural Support for Programming Languages and Operating Systems, pgs. 134–143 (1989).

While the invention has been particularly shown and described with reference to preferred embodiments thereof, it will be understood by those skilled in the art that various changes in form and details may be made therein without departing from the spirit and scope of the invention.

What is claimed is:

1. A computer implemented method of compiling a fine-grained array based source program written for a parallel machine, comprising the steps of:
   (1) entering said source program into a front end of a compiler, wherein said front end produces a common intermediate representation (CIR) syntax tree;
   (2) building a lowered intermediate representation (LIR) from said CIR syntax tree by performing a bottom-up walk of said CIR syntax tree;
   (3) mapping said LIR into a more detailed LIR', said LIR' marks which code will run on a scalar front-end processor and which code will run on a plurality of parallel vector processors; and
   (4) generating two separate code streams from said LIR'.

2. The method of claim 1, further comprises the step of optimizing said LIR.

3. The method of claim 1, wherein said plurality of parallel vector processors are functionally identical.

4. The method of claim 1, wherein said parallel vector processors form a coarse-grained hardware.

5. The method of claim 1, wherein said step (4) generates a scalar code stream that will operate on a scalar machine and a virtual register code stream that will operate on a parallel vector machine.

6. The method of claim 5, wherein said second code stream includes vector instructions which are used to control said parallel vector machine which generally processes said vector instructions concurrently.

7. The method of claim 5, further comprises the step of generating first object code for a scalar processor and second object code for said plurality of parallel vector processors.

8. The method of claim 7, wherein in said step of generating object code for said plurality of vector processors, comprises the steps of:
   (a) replacing the virtual registers with actual data processor registers and sequence pointer registers;
   (b) transforming the code generated in step (a) to overlap loads and stores;
   (c) optimizing the code generated in step (b); and
   (d) generating microcode from said optimized code of step (c).

9. The method of claim 7, wherein said first object code and said second object code are linked with a run time library in order to produce executable code, wherein said run time library operates on slicewise data.

10. A computer implemented method of compiling a source program for coarse-grained parallel machine, comprising the steps of:
    (1) receiving a source program written in a fine-grained array-based programming language;
    (2) translating said source program into target code which includes vector instruction, said target code operates on a coarse-grained hardware that processes said code concurrently and utilizes at least one register file, wherein said coarse-grained parallel machine contains a plurality of vector processors, said plurality of vector processors contains a plurality of functional units, the pipeline of said plurality of functional units being of equal or unequal length; and
    (3) treating said at least two functional units, if said at least two functional units have a pipeline of unequal length, as having equal length.

11. A computer implemented method of compiling a fine-grained array based source program written for a parallel machine, comprising the steps of:
    (a) front end means for receiving a source program, wherein said front end means produces a common intermediate representation (CIR) syntax tree;
    (b) building means for building a lowered intermediate representation (LIR) from said CIR syntax tree by performing a bottom-up walk of said CIR syntax tree;
    (c) mapping means for mapping said LIR into a more detailed LIR', said LIR' marks which code will run on a scalar front-end processor and which code will run on a plurality of parallel vector processors; and
    (d) generating means for generating two separate code streams from said LIR'.

12. The system of claim 11, further comprising optimizer means for optimizing said LIR.

13. The system of claim 11, wherein said plurality of parallel vector processors are functionally indentical.

14. The system of claim 11, wherein said parallel vector processors form a coarse-grained hardware.

15. The system of claim 11, wherein said generating means further comprises a first means for generating a scalar code stream that will operate on a scalar machine and for generating a virtual register code stream that will operate on a parallel vector machine.

16. The system of claim 15, wherein said second code stream includes vector instructions which are used to control said parallel vector machine which generally processes said vector instructions concurrently.

17. The system of claim 15, further comprising second means for generating first object code for a scalar processor and second object code for said plurality of parallel vector processors.

18. The system of claim 17, wherein said second means further comprises generating object code for said plurality of vector processors, comprising:
    (a) means for replacing the virtual registers with actual actual data processor registers and sequence pointer registers;
    (b) means for transforming the code generated in step (a) to overlap loads and stores;
    (c) means for optimizing the code generated instep (b); and
    (d) means for generating microcode from said optimized code of step (c).

19. The method of claim 17, wherein said first object code and said second object code are linked with a run time library in order to produce executable code, wherein said run time library operates on slicewise data.

* * * * *